United States Patent
Smith (12)

(10) Patent No.: US 11,612,997 B2
(45) Date of Patent: Mar. 28, 2023

(54) BICYCLE WORKSTATION

(71) Applicant: John Squires Smith, Shreveport, LA (US)

(72) Inventor: John Squires Smith, Shreveport, LA (US)

(73) Assignee: The Bike Hangar LLC, Shreveport, LA (US)

( * ) Notice: Subject to any disclaimer, the term of this patent is extended or adjusted under 35 U.S.C. 154(b) by 309 days.

(21) Appl. No.: 16/869,946

(22) Filed: May 8, 2020

(65) Prior Publication Data

US 2020/0353611 A1 Nov. 12, 2020

Related U.S. Application Data

(60) Provisional application No. 62/844,888, filed on May 8, 2019.

(51) Int. Cl.
| | | |
|---|---|---|
| *B62H 3/00* | (2006.01) | |
| *A63B 21/00* | (2006.01) | |
| *B25H 1/00* | (2006.01) | |
| *B62H 3/12* | (2006.01) | |
| *B62H 3/02* | (2006.01) | |
| *A63B 21/16* | (2006.01) | |

(52) U.S. Cl.
CPC ............ *B25H 1/0014* (2013.01); *B62H 3/00* (2013.01); *B62H 3/02* (2013.01); *B62H 3/12* (2013.01); *A63B 21/1636* (2013.01)

(58) Field of Classification Search
CPC ... B26H 3/12; B26H 3/02; B26H 3/00; B25H 1/0014; Y10T 403/34; Y10T 403/341; Y10T 403/342; Y10T 403/346; Y10T 403/347
See application file for complete search history.

(56) References Cited

U.S. PATENT DOCUMENTS

| | | | | |
|---|---|---|---|---|
| 594,627 | A * | 11/1897 | Hewlett ................... | B62H 3/00 211/22 |
| 3,947,010 | A * | 3/1976 | Zeller ...................... | B62H 3/02 269/100 |
| 4,343,404 | A * | 8/1982 | Folsom ................ | B25H 1/0007 248/114 |
| 4,630,550 | A * | 12/1986 | Weitzman .............. | A47B 13/06 403/171 |
| 5,046,882 | A * | 9/1991 | Ju .......................... | E04H 15/40 135/135 |

(Continued)

FOREIGN PATENT DOCUMENTS

| | | | | |
|---|---|---|---|---|
| GB | 2280653 A | * | 2/1995 | ........... B25H 1/0014 |
| GB | 2449243 A | * | 11/2008 | ........... B25H 1/0014 |

*Primary Examiner* — Kimberley S Wright
(74) *Attorney, Agent, or Firm* — Kaplan Breyer Schwarz, LLP (57) ABSTRACT

A bicycle workstation that is removably suspended in a doorway when in use includes several elongate members that collectively provide at least three contact surfaces, and an additional elongate member that, in the illustrative embodiment, couples to a clamp suitable for clamping to a part of a bicycle. The contact surfaces are arranged such that the weight of the bicycle forces them against a wall, door frame, and moulding on both sides of the doorway, thereby securely suspending the bicycle workstation, and the bicycle clamped to it.

20 Claims, 10 Drawing Sheets

(56) References Cited

U.S. PATENT DOCUMENTS

| | | | | | |
|---|---|---|---|---|---|
| 5,244,001 | A | * | 9/1993 | Lynch | E04H 15/50 135/145 |
| 5,590,974 | A | * | 1/1997 | Yang | A47B 47/005 403/171 |
| 5,842,581 | A | * | 12/1998 | Graefe | B62H 3/00 211/119.004 |
| 6,000,175 | A | * | 12/1999 | Gale | E04H 15/48 52/79.5 |
| 6,247,869 | B1 | * | 6/2001 | Lichvar | F16L 47/00 403/403 |
| 6,508,743 | B1 | * | 1/2003 | Fortin | A63B 1/00 482/40 |
| 7,033,290 | B1 | * | 4/2006 | Coldren | A63B 69/0084 473/422 |
| 9,114,273 | B2 | * | 8/2015 | Kehoe | A63B 21/068 |
| 2007/0062897 | A1 | * | 3/2007 | Lawrence | A47G 25/1457 211/118 |
| 2013/0116093 | A1 | * | 5/2013 | Kehoe | A63B 21/1636 482/40 |
| 2015/0191129 | A1 | * | 7/2015 | Hubacher | B60R 9/10 248/649 |

* cited by examiner

BICYCLE WORKSTATION

FIELD OF THE INVENTION

The present invention relates to a device for use when performing maintenance or repairs on a bicycle.

BACKGROUND

A work-stand is often used to conduct repairs or maintenance on a bicycle. The work-stand supports the bicycle above the ground at a comfortable working height, and ensures that the bicycle is stable and secure in its raised position.

Work-stands are typically free standing, and may be categorized as either being "tube/seat post clamping" or "axle/bottom bracket mounting." Both types of stands typically include several foldable "legs" that form a stable support (e.g., a tripod arrangement, etc.), and which attach to a vertical member, which is usually height adjustable, to position the bicycle at a comfortable working height.

For the tube-clamping work-stand, a clamp couples to a short horizontal member that is disposed near the top of the stand's vertical member, typically at a height of about 4 to 5 feet. The clamp also clamps to a bicycle's top tube or seat post.

The axle/bottom bracket-mounting work-stand includes a horizontal beam, which is disposed on top of the height-adjustable vertical member, and which is long enough to support the bicycle's bottom bracket and front fork (i.e., about 3 feet in length). The horizontal beam includes a mechanism that couples to the bicycle's front fork after its front wheel is removed. The horizontal member is at a height of about 2 to 3 feet, which, as previously noted, positions the bicycle at a comfortable working height.

Although most consumer work-stands are collapsible for storage, many of them are heavy and would be inconvenient to lug around; that is, they are not particularly portable. Moreover, many of the stands that are collapsible are still rather large even when collapsed.

SUMMARY

The present invention provides a bicycle workstation that avoids some of the inconveniences and disadvantages of the prior art.

Unlike the prior art, a bicycle workstation in accordance with the present teachings is not floor standing. Rather, it is supported above the floor/ground by removably coupling to a door frame in a manner akin to some commercially available "chin-up" bars. The workstation is lightweight; in the illustrative embodiment, it comprises mostly aluminum parts. Furthermore, the workstation is reconfigurable for storage or transport, and is quite compact when so reconfigured.

A bicycle workstation in accordance with the present teachings includes a plurality of substantially inflexible, elongate members. In the illustrative embodiments, the elongate members are in the form of tubes. Some of the members are physically dimensioned and configured to provide, collectively, at least three contact surfaces. When the workstand is in use, the contact surfaces abut wall-based surfaces proximal to a doorway. One member of the elongate members, typically a member other than those bearing the contact surfaces, is used to couple to or otherwise support a bicycle. In some embodiments, the one member is physically adapted to couple to a bicycle; in the illustrative embodiment, the physical adaptation is a clamp that couples to the one elongate member. The clamp is specifically adapted for clamping to a portion of a bicycle, such as the seat post, seat tube, or top tube thereof.

In use, the bicycle workstation is suspended in a doorway such that the three contact surfaces physically abut the surrounding wall/door frame/mouldings. One of the contact surfaces abuts one side of the wall (just above and resting on the moulding/door frame), and the other two contact surfaces abut the other side of the wall (or the surrounding mouldings/door frame). In the illustrative embodiment, an "s-shape" segment of an elongate member enables the bicycle workstation to interface with both sides of the doorway. A bicycle is supported near the free end of the one elongate member. The s-shape segment and the one elongate member thus create an offset between the point of support of the workstation (i.e., the door frame on which the one contact surface rests) and the center-of-mass of the bicycle (some distance from the doorway). This results in a "moment" or torque, which forces each contact surface against the abutting surfaces. Pressed against such surfaces on both sides of the wall surrounding the doorway, the bicycle workstation securely and stably clamps to the wall.

In some embodiments, the bicycle workstation can be considered as having two "states:" an operative state, as described above, and a stow state. In the operative state, the elongate members are oriented in different directions from one another, as necessary for properly positioning the contact surfaces. For example, in the illustrative embodiment, one contact surface is positioned above the doorway on one side of a wall, and the second and third contact surfaces are positioned, respectively, to the right and left of the doorway on the other side of the wall.

In the illustrative embodiment, this operative arrangement is accomplished by orienting one of the elongate members upward, a second member rightward, and a third leftward. These three members lie, more or less, in the plane of the doorway. In contrast, the member that supports the bicycle is oriented well out-of-plane with respect to the doorway. In fact, in the illustrative embodiment, the bicycle-supporting member is oriented orthogonally to the plane of the doorway.

In the stow state, the members are all oriented in substantially the same direction and are aligned in length (to the extent they have similar lengths), thereby providing a very compact arrangement for storage or transport.

As mentioned above, the invention provides a workstation for bicycle maintenance that is not ground supported. It is notable that there are bicycle storage devices, such as bicycle racks for cars or storage areas (e.g., garages, etc.) that are not "ground" supported. However, these bicycle racks are not intended for, nor can they be practically used as a bicycle workstation, portable or otherwise. In particular, and among any other reasons, such storage devices:

- typically support a bicycle very close to the "body" of the storage device, such that:
  - access to only one side of the bicycle is possible;
  - it is not possible to turn the bicycle's cranks, such that adjustment of the drive train (e.g., front derailleur, rear derailleur, etc.), which is a commonly performed maintenance/repair task, is not feasible;
- position a bicycle out of reach, such as automobile roof-top racks, or ceiling mounted garage racks.

Additionally, such bicycle storage devices are often permanently installed (e.g., affixed to a wall, etc.) and are therefore not portable. And since they have only one mode of use (i.e., bicycle storage), they are typically not reconfigurable.

In any case, bicycle storage devices are not made to couple to a doorway, via any methodology or mechanism, nor would there be any reason to do so. That is to say, it is quite impractical to store a bicycle in a doorway, since that would effectively block the doorway.

In some embodiments, the invention provides a bicycle workstation comprising a plurality of elongate members, wherein:
  (a) at least some of a first group of the elongate members in the plurality are configurable, collectively, and when in use, to abut surfaces that are proximal to a doorway at a total of at least three locations on two wall-sides thereof, thereby collectively providing at least three contact surfaces of the bicycle workstation; and
  (b) one elongate member of the plurality not included in the first group, wherein the one elongate member is physically adapted to couple to or otherwise support a bicycle,
  wherein, when the bicycle workstation is in use supporting a bicycle, the weight of the bicycle forces the contact surfaces against the surfaces proximal to the doorway, thereby securely suspending the bicycle workstation proximal to the doorway above an underlying surface.

In some embodiments, the invention provides a bicycle workstation, comprising:
  a plurality of elongate members extending from a coupler;
  the coupler, wherein the coupler is physically configured to orient the elongate members in a first arrangement in which:
  a first one of the elongate members and a second one of the elongate members are collinear with respect to one another and extend in opposite directions from the coupler;
  a third one of the elongate members couples to a device that is suitable for coupling to a bicycle, wherein the third elongate member extends from the coupler in a direction that is orthogonal to that of the first and second elongate members;
  a fourth one of the elongate members extends from the coupler in a direction that is orthogonal to that of the first and second elongate members, and orthogonal to that of third elongate member.

Embodiments of the bicycle workstation may further comprise at least one other feature, in any (non-conflicting) combination, from among the features described in the detailed description below and depicted in the accompanying drawings.

DETAILED DESCRIPTION

Figure 1:
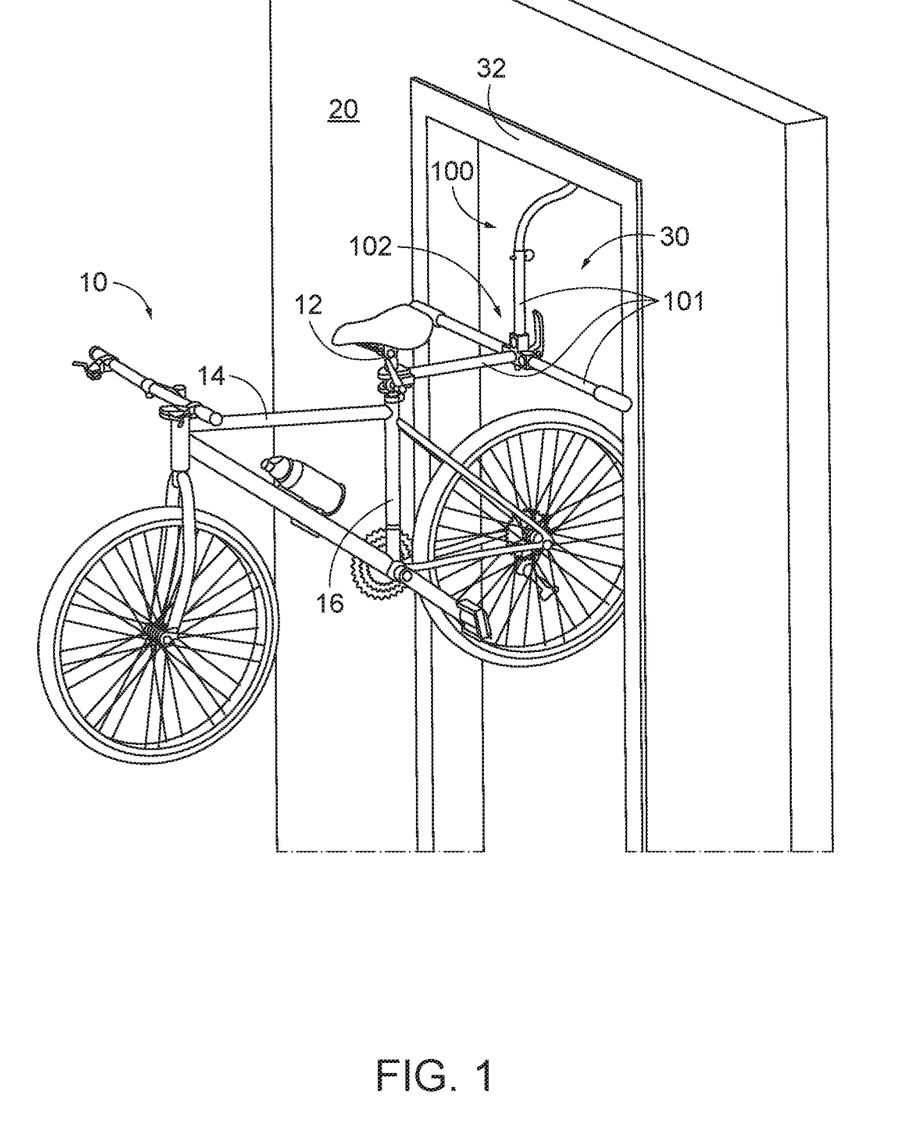
FIG. 1 depicts a bicycle workstation supporting a bicycle in accordance with the illustrative embodiment of the invention.

FIG. 1 depicts bicycle workstation 100 in accordance with the present teachings. Embodiments of bicycle workstation 100 include a plurality of elongate members 101. In the illustrative embodiment, elongate members 101 are substantially inflexible. In some embodiments, bicycle workstation 100 includes coupler 102, which, at a minimum, couples elongate members 101 together and defines the operating configuration of the workstation.

FIG. 1 depicts bicycle workstation 100 in use, supporting bicycle 10 in doorway 30 of wall 20. In FIG. 1, bicycle workstation 100 is depicted clamping bicycle 80 at its seat post 12. The bicycle workstation is also capable of clamping to top tube 14 or seat tube 16 of the bicycle. When clamping to such other parts of bicycle 80, the bicycle's orientation might be different than pictured. The ability to place bicycle 80 in different orientations is discussed in more detail below. As discussed in more detail later in this specification, in some other embodiments, bicycle workstation 100 supports bicycle 80 by means other than clamping.

Figure 12:
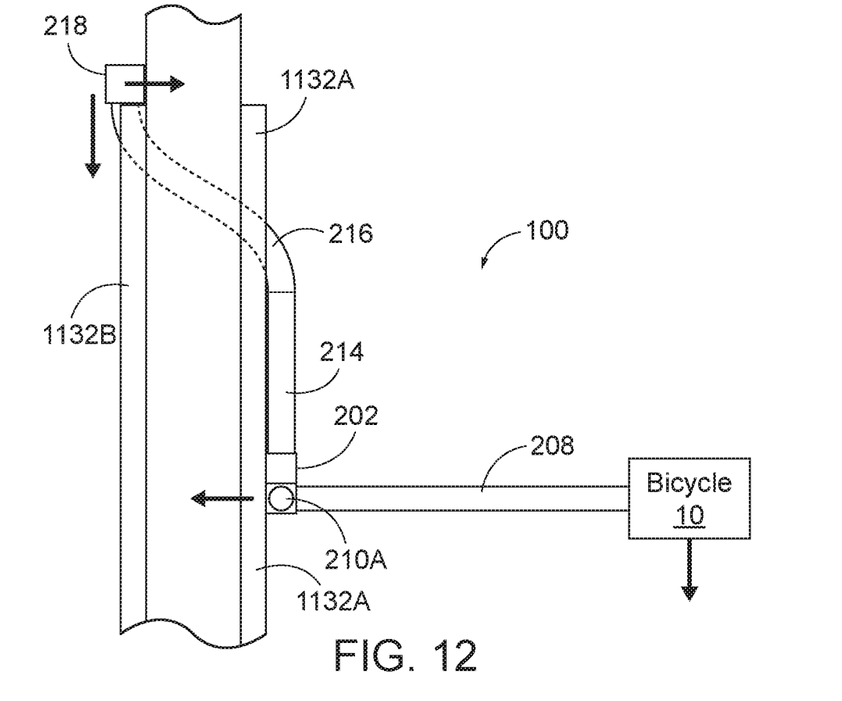
FIG. 12 depicts a side view of the bicycle workstation in a doorway, showing forces to which the bicycle workstation is subjected.

As described in further detail in conjunction with FIG. 12, by virtue of the location of the center-of-mass of bicycle 80 with respect to the plane of doorway 30, the weight of the bicycle creates a moment or torque that effectively "presses" bicycle workstation 100 against both sides of wall 20. In particular, the moment forces two of elongate members 101 on the pictured side of wall 20 against door frame/moulding 32 on the left and right of doorway 30, and forces, on the other side (not depicted) of wall 20, a portion of the bicycle workstation against the wall above the door frame/moulding. This securely suspends the bicycle workstation in the doorway.

A few specific embodiments of bicycle workstation 100 are depicted in the accompanying drawings and described in this disclosure. It is within the capabilities of those skilled in the art, based on this disclosure, to design and build embodiments of bicycle workstation 100 that are not presented herein but are otherwise consistent with the principles of the invention.

Figure 2:
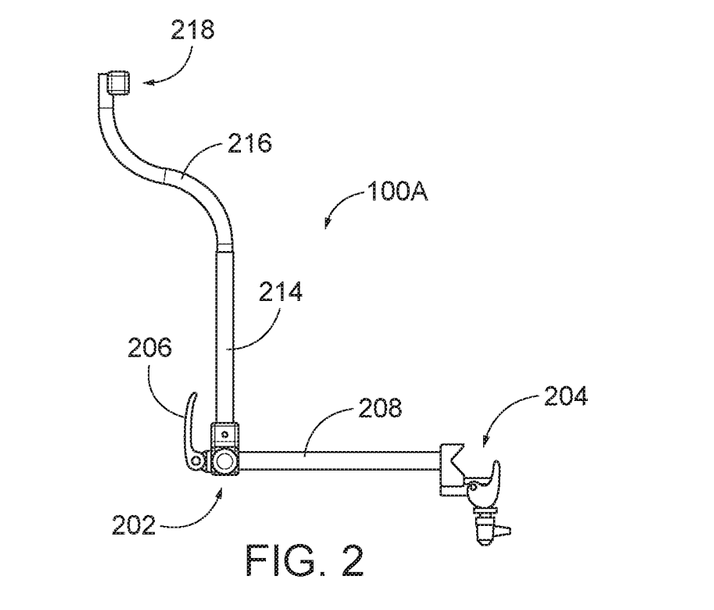
FIG. 2 depicts a perspective view of an illustrative embodiment of the bicycle workstation of FIG. 1.
Figure 3:
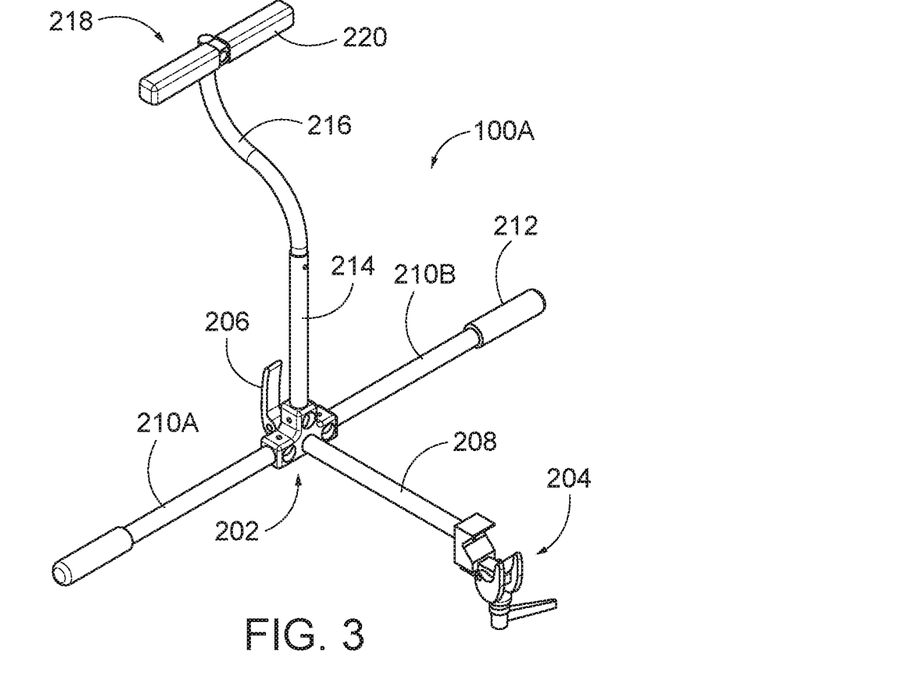
FIG. 3 depicts a side view of bicycle workstation of FIG. 2.

FIGS. 2 and 3 depict respective perspective and side views of bicycle workstation 100A, which is an embodiment of bicycle workstation 100 of FIG. 1. The salient elements of bicycle workstation 100A include coupler 202, a plurality of tubes 208, 210A, 210B, 214, 216, bar 218, clamp 204, and fastener 206, interrelated as shown.

Figure 4:
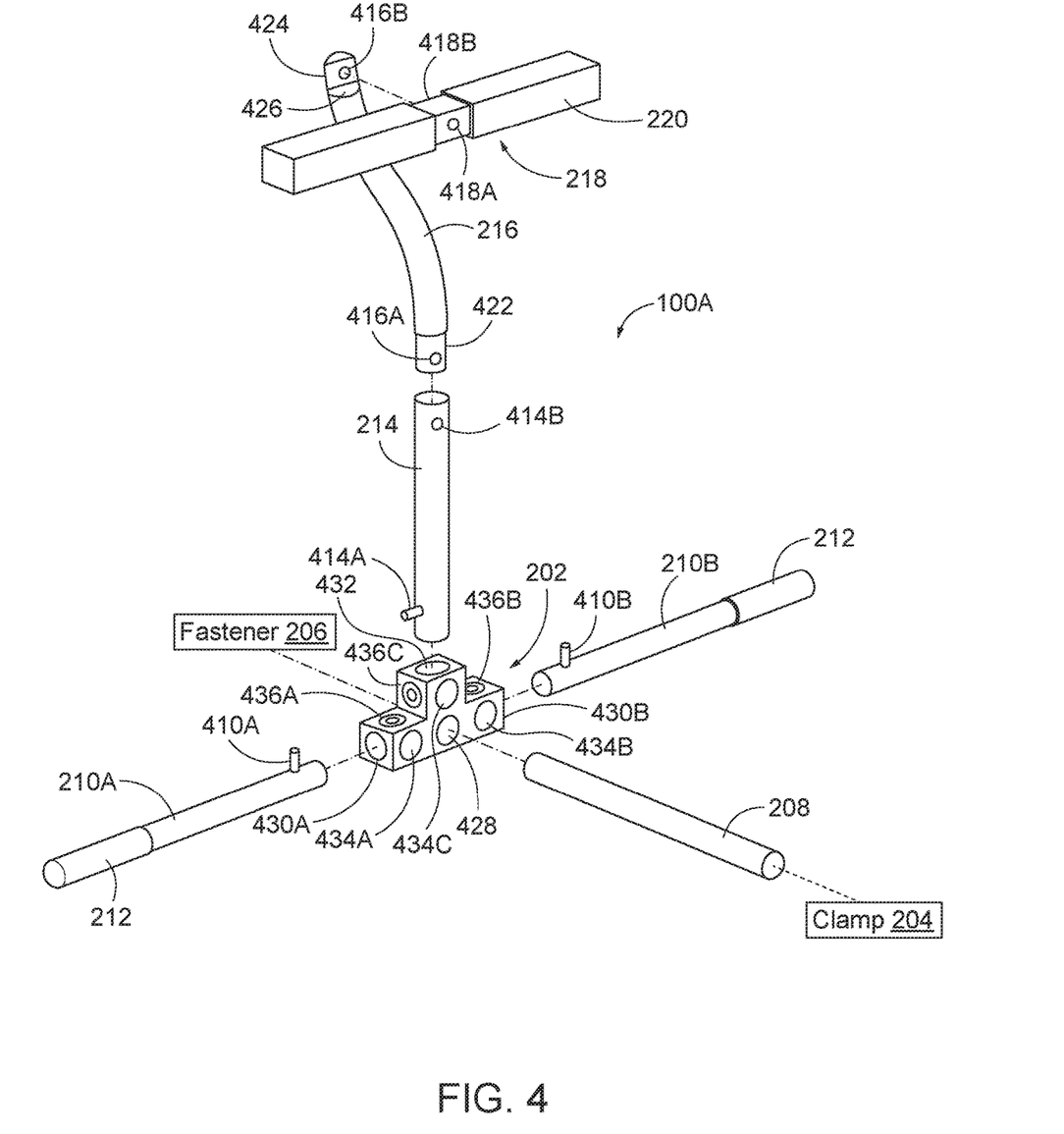
FIG. 4 depicts an "exploded" view of the bicycle workstation of FIG. 2.

Coupler 202, which is one specific embodiment of coupler 102 of FIG. 1, includes a plurality of openings, as described in further detail in conjunction with FIG. 4, etc. Some of the openings are for receiving elongate members 101, implemented in this illustrative embodiment as the aforementioned plurality of tubes.

In coupler 202, certain of the openings are used to position the elongate members for operational use of bicycle workstation 100, whereas some other of the openings position the elongate members for stowage. In particular, and with reference to FIG. 4, openings 428, 430A, 430B, and 432 receive the members for operational use, and openings 428, 434A, 434B, and 434C receive the members for stowage, opening 428 doing double duty for both the operational and stow states.

In some other embodiments, the coupler has a form factor similar to that of coupler 202, but it does not include openings for storing elongate members 101 when bicycle workstation 100 is not in use. In some such embodiments, the elongate members are simply removed from the coupler for storing the bicycle workstation.

In some further embodiments, the coupler has a form factor similar to that of coupler 202, but elongate members 101 are permanently attached to it; in such embodiments, additional openings for storing the elongate members are not required. For such embodiments, bicycle workstation 100 has only a single configuration or state—the operational configuration. In some embodiments of a non-reconfigurable bicycle workstation in accordance with the present teachings, a coupler, as a discrete element, is not required. Rather, the elongate members can be attached directly to one another, or, as appropriate, two or more of the elongate members can be formed as a unitary whole; in other words, two (or more) members can be replaced by a single, appropriately shaped member.

With continuing reference to FIGS. 2 through 4, coupler 202 receives "bicycle support-" tube 208 in opening 428. In some embodiments, bicycle-support tube 208 includes a physical adaptation that facilitates coupling to a bicycle. In the illustrative embodiment, the physical adaptation is clamp 204, which is disposed at the free end of bicycle support-tube 208. The clamp is operatively coupled to fastener 206, which is located "behind" coupler 202 at the opposite end of bicycle support-tube 208. In some embodiments, this operative coupling is created by a long, threaded rod (not depicted; see FIG. 7: rod 754) that passes through bicycle support-tube 208 and coupler 202, and which couples to both clamp 204 and fastener 206. Briefly, releasing fastener 206 enables clamp 204 to be rotated by any angle (0° to 360°) about the long axis of bicycle support-tube 208. This permits clamp 204 to be positioned, for example, to couple to a bicycle's top tube (at zero rotation with respect to the position of clamp 204 in FIGS. 2 and 3), as well as to couple to a bicycle's seat post or seat tube (at about a 90° rotation). This capability also permits a clamped bicycle to be oriented as desired. Fastener 206 and clamp 204 are described in further detail later in this specification in conjunction with FIGS. 6 and 7.

In some other embodiments not depicted herein, the physical adaptation is "u-" shaped grabber comprising a resilient material that deforms to receive and hold any shape/size seat post or bicycle-frame tube (e.g., seat tube, top tube, etc.). In some other embodiments, the physical adaptation is a double pronged receiver that receives the rails of the bicycle's saddle in a gap between the two prongs. In some embodiments, the bicycle's saddle simply rests near the free-end of the elongate member. In conjunction with the present disclosure, it is within the capabilities of those skilled in the art to specify or design a means by which bicycle support-tube 208 can couple to a part of a bicycle to facilitate suspending the bicycle via bicycle workstation 100.

Returning to the discussion of the embodiment depicted in FIGS. 2-4, bicycle support-tube 208 is received by opening 428 of coupler 202 regardless of the state (i.e., operational or stow) of bicycle workstation 100. That is not true, however, for the other elongate members. In particular, in the operational state or configuration, which is depicted in FIGS. 2 through 4, "cross" tubes 210A and 210B are received by respective side-facing openings 430A and 430B of coupler 202. A length of padding 212 is disposed near the free end of cross tubes 210A and 210B. As explained later in this specification, this region of each cross tube is a contact surface with a door frame, moulding, or wall. Padding 212 is intended to protect the region around the doorway at which bicycle workstation 100 is being used. Moreover, padding 212 serves as a high-friction surface, thereby assisting in supporting bicycle workstation 100 against a doorway.

"Upright" tube 214 is received by upper opening 432 in coupler 202. "S" tube 216 couples to the free end of upright tube 214. In the illustrative embodiment, an end of s-tube 216 has reduced-diameter region 422 (FIG. 4), which permits it to fit within the free end of upright tube 214. "Grip" bar 218 is coupled to the free end of s-tube 216 in a horizontal orientation; that is, parallel to cross tubes 210A and 210B in the illustrative embodiment. Padding 220 covers grip bar 218. Since bar 218 abuts a doorframe, moulding, and/or wall when the bicycle workstation is in the use, padding 220, like padding 212, prevents such surfaces from being marred, and also provides a high-friction surface.

Referring again to FIG. 4, in the illustrative embodiment, grip bar 218 is adapted to receive a threaded member (not depicted), such as a screw, bolt, or the like, to couple to s-tube 216. Specifically, in the illustrative embodiment, for its final one to two inches (as a function of the relevant dimension of grip bar 218), s-tube 216 provides attachment region 424, which includes hole 416B, which may be internally threaded, as appropriate, for receiving the aforementioned threaded member, by which it attaches to grip bar 218.

The surface of region 424 that faces grip bar 218 has a contour suitable for abutment with the grip bar. For example, in the illustrative embodiment, the surface of grip bar 218 is flat and vertical at the location at which it couples to region 424 of s-tube 216. Consequently, the surface of region 424 that is intended to abut the grip bar should be flat and vertical, etc. In some embodiments, grip bar 218 includes holes 418A and 418B (the latter is obscured in FIG. 4) for receiving the threaded member. In some embodiments, the threaded member is fixed to one or the other of s-tube 216 or grip bar 218, such that it protrudes therefrom, to be received by the other of the grip bar or the s-tube.

It is notable that, in the illustrative embodiment, the horizontal cross section of region 424 is smaller than that of the adjacent portion of s-tube 216, resulting in lip 426. The lip aids in supporting grip bar 218 and prevents it from rotating about the threaded member (not depicted) that couples s-tube 216 to grip bar 218 if the threaded member were to loosen.

To facilitate rapid assembly and disassembly, in the illustrative embodiment, cross tubes 210A and 210B, and upright tube 214 fasten to coupler 202 via spring-loaded pins that pass through respective holes in coupler 202. In particular, cross tube 210A includes spring-loaded pin 410A, which is received by hole 436A of the coupler. Cross tube 210B includes spring-loaded pin 410B, which is received by hole 436B of coupler 202. And upright tube 214 includes spring-loaded pin 414A, which is received by hole 436C of the coupler.

Upright tube 214 and s-tube 216 can be fastened in the same manner; that is, spring-loaded pin 416A of reduced-diameter region 422 of s-tube 216 is received by hole 414B in upright tube 214. In some other embodiments, other types of fasteners, such as pull pins (non-spring loaded), bolts, etc., are used to couple the various tubes to coupler 202 and to couple upright tube 214 and s-tube 216.

As discussed further below, in some embodiments, bicycle support-tube 208 does not include a spring-loaded pin or other fastener for attachment to coupler 202. Bicycle support-tube 208 remains tight to coupler 202 via the action of fastener 206, which couples via a rod (not depicted) to clamp 204 that passes through the bicycle support-tube.

Moreover, it is notable that in operation (i.e., when supporting the weight of the bicycle), the relatively tight tolerance between the outer diameter of the tubes and the diameter of the openings in coupler 202 is such that the tubes will remain securely in place without the use of fasteners. At a minimum, the fasteners assist in keeping the tubes in place in coupler 202 when workstation 100 is not loaded by the weight of a bicycle.

In yet some further embodiments, openings 428, 430A and 430B, 432, and optionally, 434A, 434B, and 434C are internally threaded and at least one end of tubes 208, 210A, 210B, and 214 are externally threaded. In such embodiments, the tubes couple to coupler 202 via threaded engagement. It will be appreciated that, in embodiments in which the tubes and coupler 202 couple via threaded engagement, holes 436A through 436C are not required.

As seen for example in FIG. 3, s-tube 216 creates a horizontal offset between the position of grip bar 218 and the (vertical) plane in which coupler 202, cross tubes 210A and 210B, and upright tube 214 reside. This offset is required for the functioning of bicycle workstation 100. In particular, grip bar 218 is positioned to rest on the top of the door frame/moulding on one side of the doorway and cross tubes 110 are positioned to rest against the upright members of the doorframe on the other side of the doorway. (See FIGS. 11A-11C.)

Figure 5A:
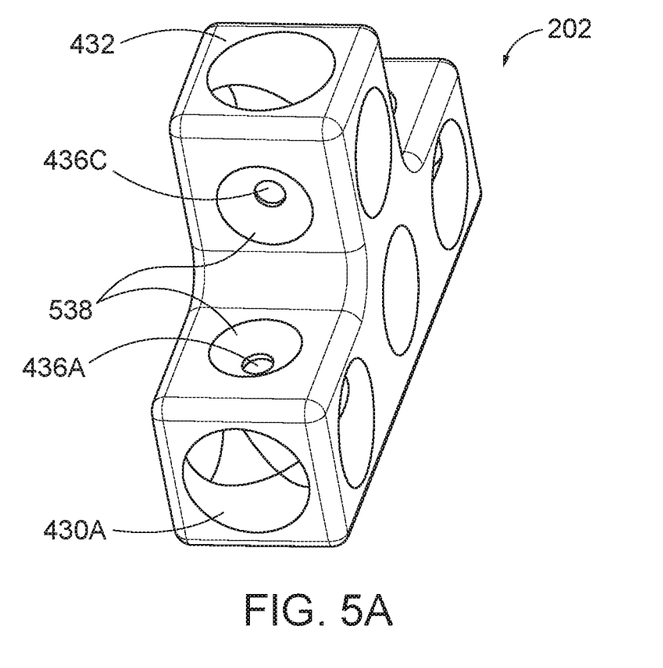
FIG. 5A depicts a perspective view showing the top and side of an embodiment of a coupler of the bicycle workstation of FIG. 2.

FIG. 5A depicts a perspective view of coupler 202. As previously noted, in the illustrative embodiment, at least three of the elongate members—in particular, cross-tubes 210A and 210B, and upright tube 214—are fastened to coupler 202, such as by spring-loaded pins. For example, cross-tube 210A is received by opening 430A, and pin 410A (FIG. 4) on the cross tube passes through opening 436A in coupler 202, locking the tube to the coupler. Likewise, upright tube 214 is received by opening 432, and pin 414A (FIG. 4) on the upright tube passes through opening 436C in coupler 202. Coupler 202 includes several adaptations to facilitate the use of such spring-loaded pins.

Figure 5B:
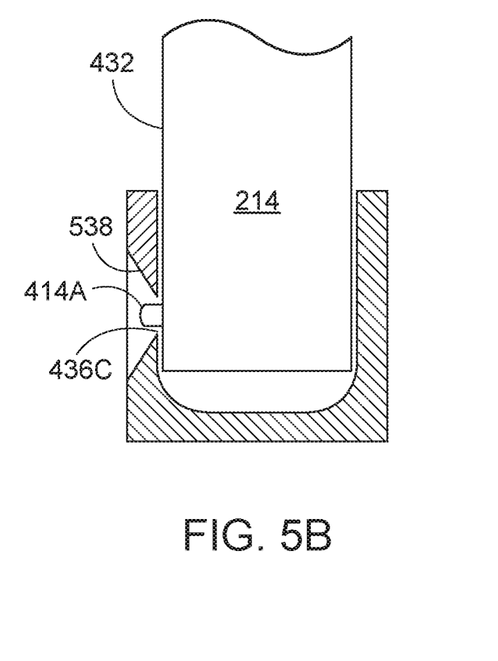
FIG. 5B depicts countersunk openings in the coupler of FIG. 5A for use with spring-loaded pins.
Figure 5C:
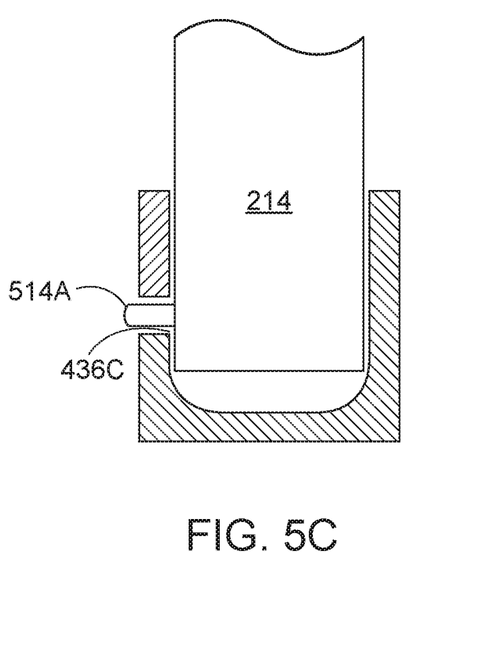
FIG. 5C depicts spring-loaded pins in use with openings in a coupler that are not countersunk.

With continuing reference to FIG. 5A, and referring additionally to FIGS. 5B and 5C, the openings that receive pins (such as openings 436A, 436B, 436C) are "countersunk." That is, these openings are surrounded by conically tapering region 538. Comparing FIG. 5B to FIG. 5C illustrates the benefit of using a countersunk hole in this context. Specifically, the countersunk hole in FIG. 5B enables use of a shorter pin, and also makes it easier to depress the pin sufficiently so as to remove an elongate member, such as upright tube 214, from coupler 202. (Compare pin 414A of FIG. 5B to pin 514A of FIG. 5C.)

Another adaptation that facilitates the use of spring-loaded pins is that the wall thickness of coupler 202 is relatively uniform and there are no sharp transitions on the interior surfaces thereof. Consequently, once a pin is depressed and moving along an interior surface of the coupler, it will not expand until it exits therefrom. Or if it does expand, it will not encounter any sharp transitions after such expansion that would prevent continued movement. This prevents the spring-loaded pins from getting stuck within coupler 202 during insertion or removal operations.

Figure 5D:
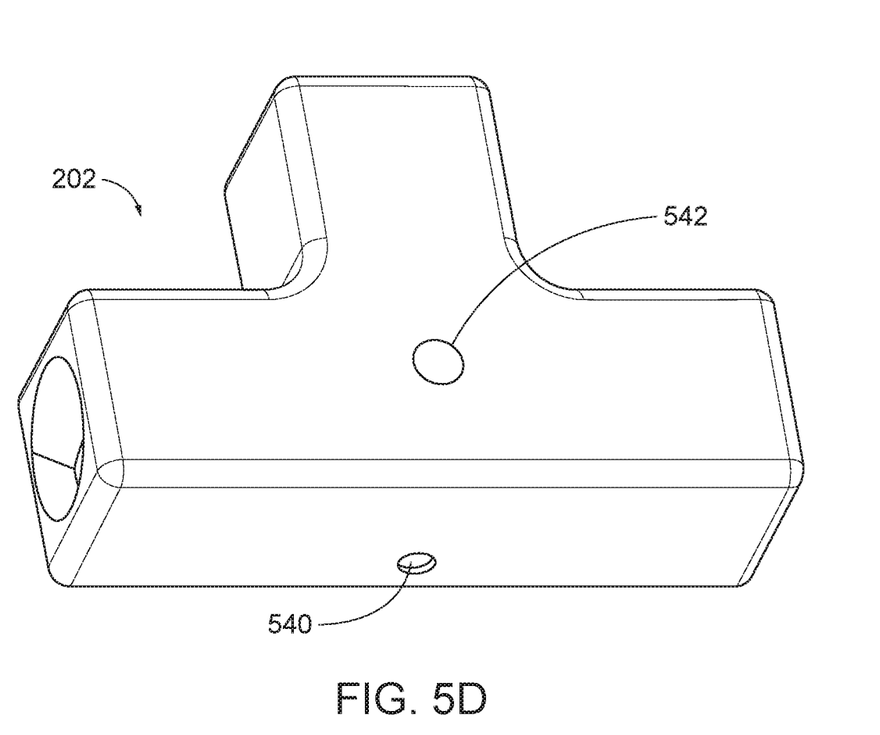
FIG. 5D depicts a perspective view show the bottom and back of the coupler shown in FIG. 5A.

FIG. 5D depicts a three-quarters perspective view showing the back and bottom of coupler 202. In the embodiment depicted, the bottom of coupler 202 includes opening 540. A pull pin (not depicted) can be inserted through opening 540 and through a complementarily located opening (not depicted) in bicycle support-tube 208. The bicycle support-tube is substantially immobilized via the arrangement of fastener 206 at one end and clamp 204 at the other end. However, the use of a pull pin, as disclosed above, can prevent any tendency for bicycle support-tube 208 to rotate when, due to the rotational orientation of clamp 204, the weight of a clamped bicycle might prompt such rotation. Alternatively, a spring-loaded pin can be used in place of a pull pin. Opening 542 located at the back of coupler 202 permits passage of a rod (see FIG. 7: rod 754) through bicycle support-tube 208 for coupling fastener 206 to clamp 204.

Figure 6:
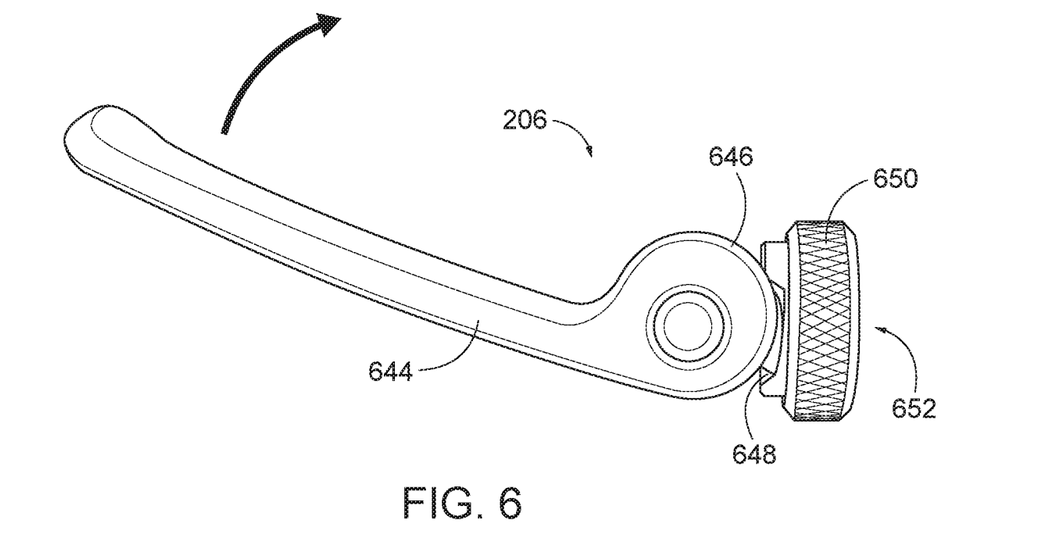
FIG. 6 depicts an embodiment of a fastener for the bicycle workstation of FIG. 2.

FIG. 6 depicts fastener 206. In the illustrative embodiment, fastener 206 is a "cam-lever" fastener, as is commercially available. Fastener 206 includes quick-release lever 644, having camming surface 646. Lever 644 is rotatably coupled (e.g., via pins, etc.) to an externally threaded cap (not depicted) situated within thumb nut 650. The thumb nut receives, at opening 652, long, threaded rod 754 (see FIG. 7), which couples at its other end to clamp 204. Thumb nut 650 is tightened against coupler 202, providing initial engagement of fastener 206 to clamp 204.

Curved pad 648 is adjacent to camming surface 646. As lever 644 is rotated (towards the vertical in FIG. 6), camming surface 646 presses against pad 648 with increasing force due to the non-circular contour of the camming surface, generating a fastening force. In this manner, lever 644 is used to quickly release/tighten clamp 204, such as to reorient the clamp (e.g., for altering its orientation to couple to a bicycle's top tube versus its seat post, etc.).

Figure 7:
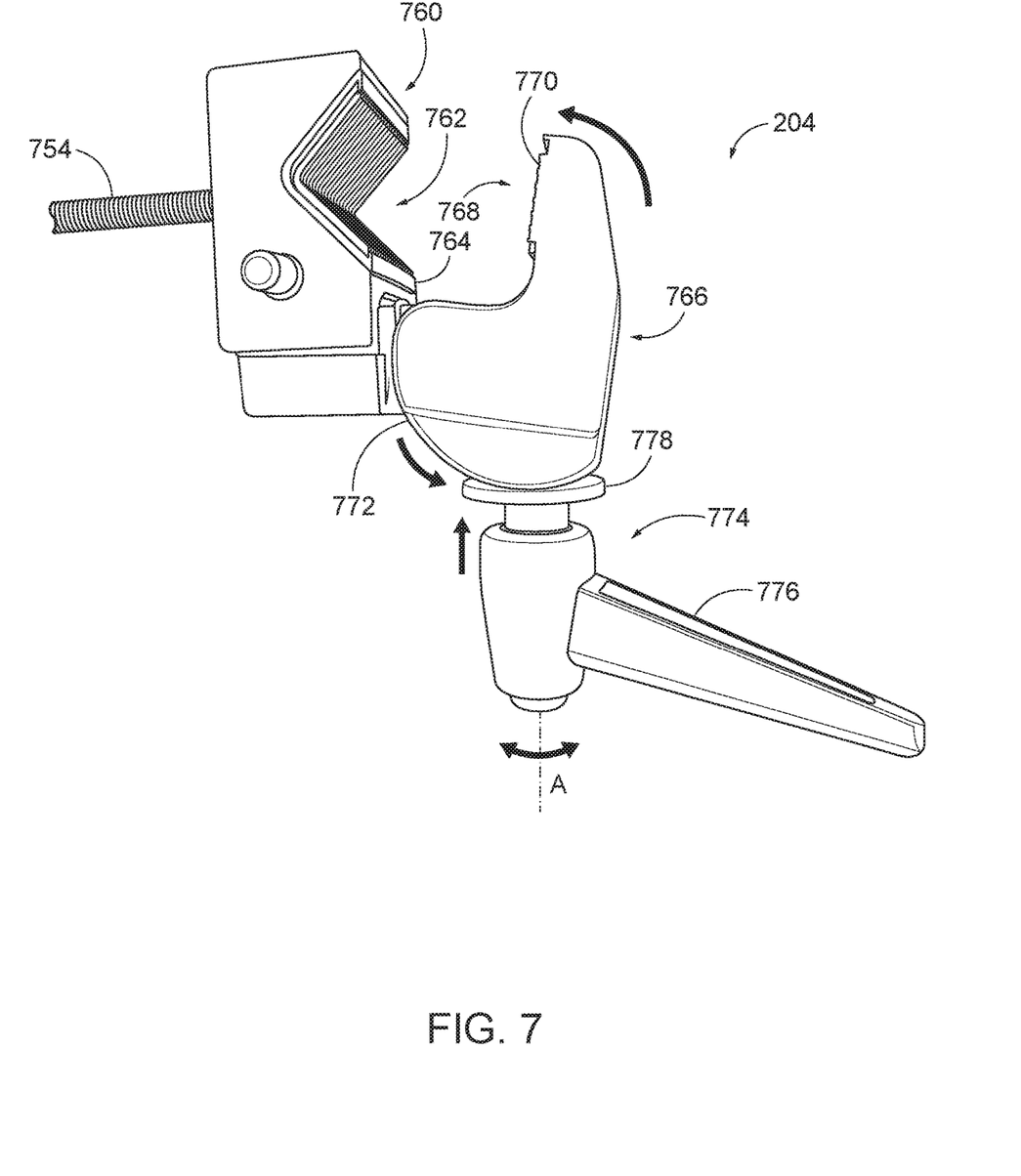
FIG. 7 depicts an embodiment of a clamp for the bicycle workstation of FIG. 2.

FIG. 7 depicts clamp 204, such as is commercially available under the trade name "Super Clamp" from Impact Studio Lighting Company. The clamp should have a weight capacity suitable for supporting the weight of a bicycle (e.g., about 15 to about 35 pounds) and be able to accommodate a tube or seat post having a thickness in a range of about 1 to 2 inches in cross section.

Clamp 204 includes female portion 760, male portion 766, and actuator 774. The male and female portions of clamp 204 are coupled to one another at a spring-loaded hinge (not depicted) that permits the male portion to partially rotate towards or away from the female portion, thereby engaging or disengaging clamping action. Actuator 774 causes such partial rotation.

Female portion 760 includes tube-receiving region 762, which in the illustrative embodiment is "v" shaped. Resilient (e.g., rubber, etc.) padding 764 is disposed on the surface of tube-receiving region 762 to prevent damage to the finish of the clamped tube of a bicycle.

Male portion 766 includes tube-gripping region 768. Resilient (e.g., rubber, etc.) padding 770 is disposed on the surface of tube-gripping region 768 to prevent damage to the bicycle's tubes. Padding 764 and 770 have a textured surface to improve the clamp's grip on a clamped tube. Male portion 766 also includes camming surface 772.

Actuator 774 includes lever 776 and integral pedestal 778. The actuator is coupled (e.g., by a threaded member, etc., not depicted) to male portion 766 of clamp 104. Rotating lever 776 in one direction or the other about axis A causes pedestal 778 to raise or lower. As pedestal 778 raises, camming surface 772 rotates in the direction indicated by the arrow (i.e., to the "right" in FIG. 7). As camming surface 772 rotates in the indicated direction, tube-gripping region 768 of male portion 766 moves toward female portion 760, enabling clamping action. As pedestal 778 is lowered by rotating the lever in the opposite direction, camming surface 772 rotates toward the left, causing tube-gripping region 768 to move away from female portion 760, thereby releasing a clamped tube.

Long, threaded rod 754 (only a portion of which is shown) couples to the back surface of female portion 760 of clamp 204. As previously noted, rod 754 passes through bicycle support-tube 208 and through opening 542 in coupler 202 to couple to fastener 206.

Figure 8A:
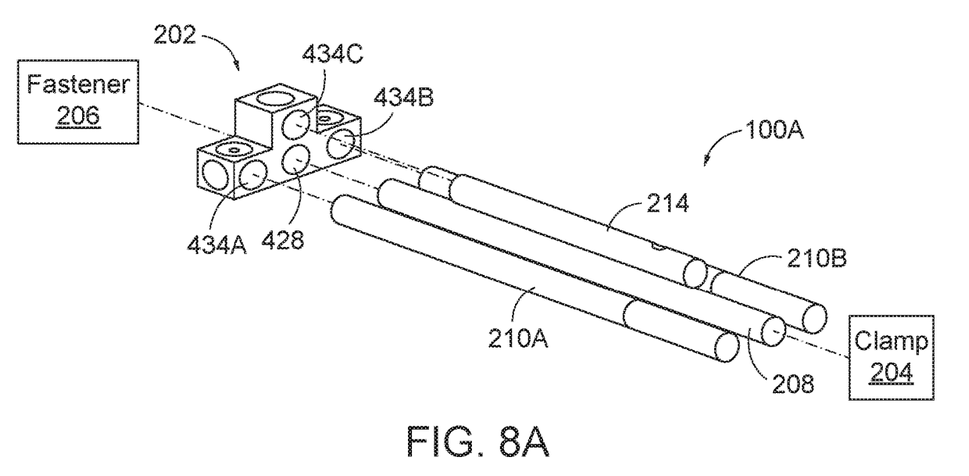
FIG. 8A depicts an "exploded" view of the bicycle workstation of FIG. 2 in the stow state.
Figure 8B:
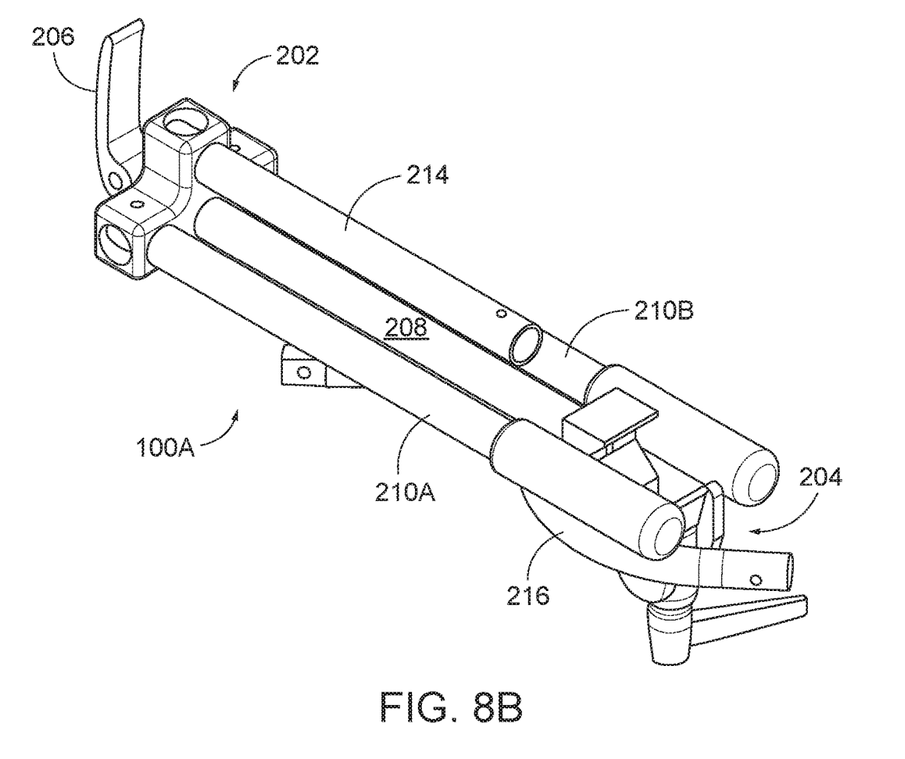
FIG. 8B depicts the bicycle workstation of FIG. 2 in the stow state.

FIGS. 8A and 8B depict bicycle workstation 100 in its stow state. FIG. 8A provides an "exploded" view. As depicted in these Figures, in addition to defining the configuration of bicycle workstation 100 in its operational state, coupler 202 also defines the stow configuration of the workstation, and provides stowage for the various tubes.

As previously noted, and with the exception of opening 428, one group of openings in coupler 202 are used to position the elongate members in their operational positions, and another group of openings are used for stowage of the elongate members. By virtue of the dimensions/symmetry of coupler 202, the spring-loaded pins that locked the elongate members to coupler 202 when in the operational state align with the requisite openings to lock the members to coupler 202 in the stow state.

As previously noted, bicycle support-tube 208 is not moved for storage; it remains in opening 428. However, cross tubes 210A and 210B are moved from their operational openings to respective stowage openings 434A and 434B. Upright tube 214 is moved from its operational opening to stowage opening 434C. As depicted in FIG. 8B, s-tube 216 can be snugged up against the underside of the tubes utilizing clamp 204, in embodiments utilizing such a clamp. Grip bar 218 can be disengaged (e.g., unbolted, etc.) from the "front" of s-tube 116 and fastened to the reverse side of thereof. In the stow state, grip bar 218 is axially aligned with the s-tube, not orthogonal to it as in use.

Typical dimensions for bicycle workstation 100 and elements thereof are provided below:
Cross tubes 210A/B: Length: 16-18 in.; O.D.: 1 in.
Upright tube 214: Length: 11-13 in.; O.D.: 1 in.
Bicycle support-tube 208: Length: 11-14 in.; O.D.: 1 in.
S-tube 216: Length: 11-13 in.; O.D.: 0.9 in.
Grip bar 218: Length: 9-12 in.; xsect: 1 to 2 in., square Coupler 202: Length: 3.5-5.5 in.; height: 3-4 in.
All dimensions are approximate and can vary by about +/−20 percent.
Lateral offset between wall-facing surface of grip bar 218 and centerline of upright tube 214: 5-6 in.
Vertical offset between centerline of grip bar 218 and centerline of cross tubes 210A/B: 21-23 in.
Lateral extent of installed cross tubes 110A/B: 36-37 in.
The overall dimensions of bicycle workstation 100A in its stow state is about 21 inches in length by about 6 inches across.

Figure 9A:
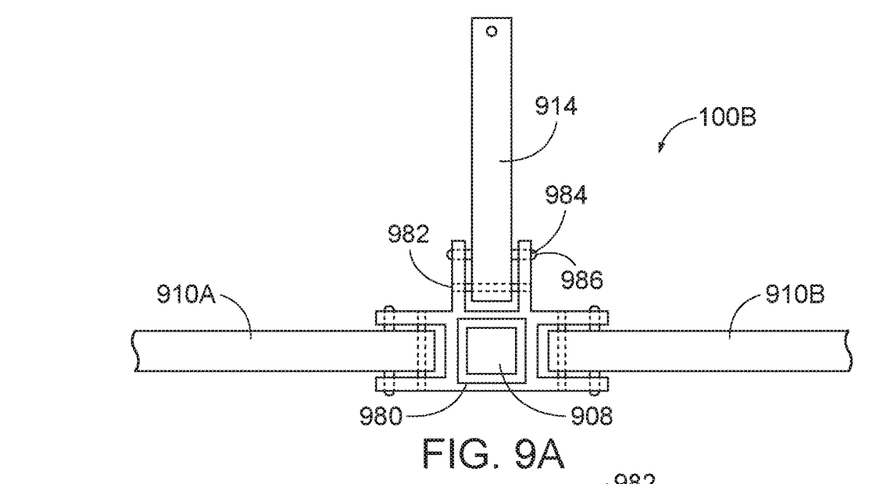
FIG. 9A depicts a front view of a first alternative embodiment of a bicycle workstation in accordance with the present teachings.

FIG. 9A depicts bicycle workstation 100B in accordance with a first alternative embodiment of the invention. FIG. 9A depicts only those elements of bicycle workstation 100B that differ from those of bicycle workstation 100A. Not depicted, for example, are clamp 204, fastener 206, s-tube 216 (or any analog thereof), and grip 218 (or any analog thereof), which are common to both workstations 100A and 100B. It is notable that bicycle workstation 100B adopts essentially the same operational configuration and stow configuration as workstation 100A.

The primary difference between these embodiments is the design of the coupler. Coupler 902 of bicycle workstation 100B is depicted in isolation in FIG. 9B. The salient differences between the two workstations is that for bicycle workstation 100B, the elongate members—the tubes; that is, cross tubes 910A and 910B, upright tube 914, and bicycle support-tube 908—are not removable from coupler 902. Rather, coupler 902 is configured to rotate cross tubes 910A and 910B and upright tube 914 between the operational configuration depicted in FIG. 9A and the stowed configuration depicted in FIG. 9C.

Figure 9B:
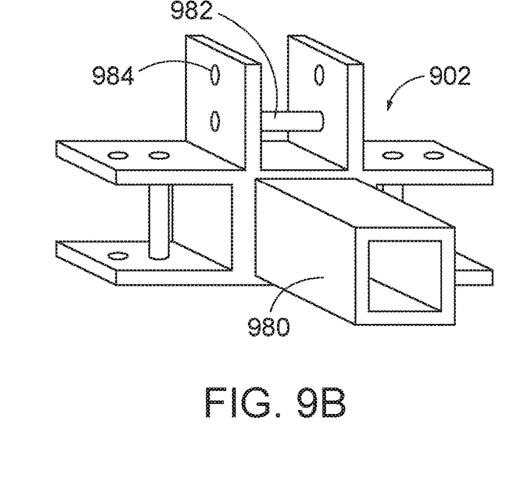
FIG. 9B depicts of a perspective view of a coupler of the bicycle workstation of FIG. 9A.

In particular, the cross tubes and upright tube are each rotatably coupled, via pins 982, to coupler 902. In the embodiment depicted, tubes 910A, 910B, and 914 are capable of greater than 180 degrees of rotation about pins 982 (i.e., 90+ degrees in the "positive" direction and 90+ degrees in the negative direction with respect to the operational orientation). Since rotation of those tubes other than to align with bicycle support-tube 908 is not required, rotation in the negative direction (i.e., towards the "back" of coupler 902) can be prevented in other embodiments in any number of ways. For example, a "stop" (such as a plate, etc.) can be placed on the "back" of coupler 902, pins 982 can be designed to prevent negative rotation, etc.

Figure 9C:
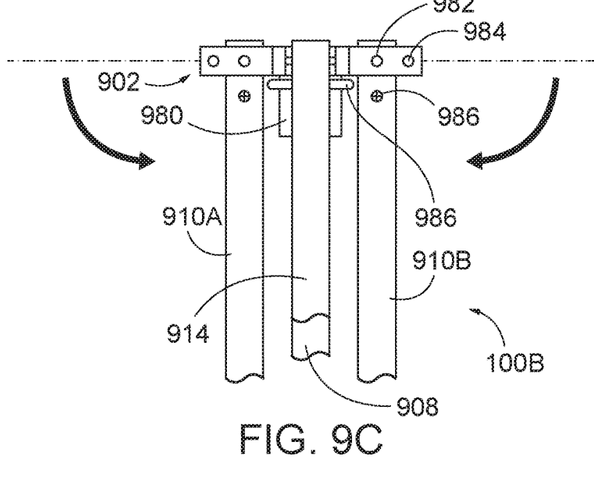
FIG. 9C depicts a top view of the bicycle workstation of FIG. 9A, showing the elongate members positioned in a stow state.

Thus, to reconfigure bicycle workstation 100B from an operational state to the stow state depicted in FIG. 9C, cross tubes 910A and 910B are rotated 90 degrees "inward" toward bicycle support-tube 908, and upright tube 914 is rotated 90 degrees "downward" toward bicycle support-tube 908. As in the manner of bicycle workstation 100A, the position of bicycle support-tube 908 is not changed between the operational and stow states.

To maintain cross tubes 910A and 910B and upright tube 914 in their operational position, these tubes each include two spring-loaded pins 986. These pins are received by openings 984 in coupler 902. These pins are simply depressed to release the tubes for rotation. Like coupler 902, openings 984 for receiving the spring-loaded pins can be countersunk to facilitate depressing the pins. Coupler 902 additionally includes support shroud 980, which receives and supports bicycle support-tube 908.

Like bicycle workstation 100A, the s-tube (not depicted) is removable from upright tube 914 and can be bundled with the other tubes by placing it in the clamp (not depicted) when present, which couples to bicycle support-tube 908.

Figure 10:
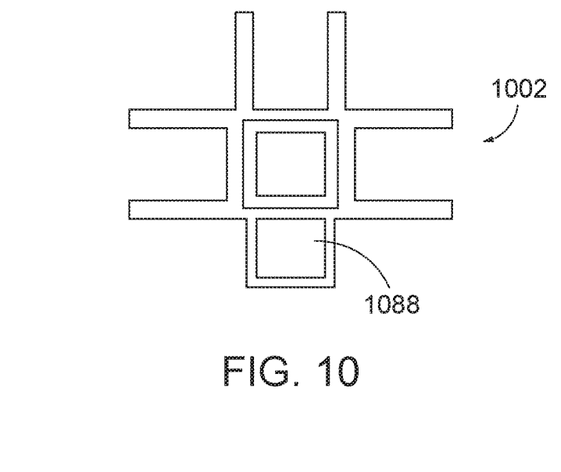
FIG. 10 depicts an alternative embodiment of the coupler of FIG. 9B.

In an alternative embodiment of coupler 902—coupler 1002 depicted in FIG. 10—the s-tube is accommodated during the stow state by receiver 1088. That is, the s-tube is removed from upright tube 914 in preparation for stowage, and then inserted into receiver 1088. The s-tube can be immobilized in receiver 1088 via a spring-loaded pin, etc, In bicycle workstation 100A, the elongate members were embodied as cylindrical tubes. In bicycle workstation 100B, the elongate members were embodied as square tubes. It is to be understood that elongate members 101 of the various embodiments can have any convenient cross-sectional shape, including circular, oval, square, rectangular, or the like.

In the illustrative embodiments, all of the elongate members (tubes), as well as couplers 202, 902, and 1002 are made from aluminum, because it is lightweight, possesses high strength, is corrosion resistant, resists attack from most chemicals, is relatively inexpensive, and relatively easy to machine. Other materials that are light and strong, such as other metals, alloys, or fiber-composite materials could alternatively be used, as appropriate. Clamp 204 comprises a lightweight cast alloy.

FIGS. 11A through 11C, and 12 depict further details concerning the manner in which embodiments of bicycle workstation 100 couple to a doorway. These figures depict bicycle workstation 100A; however they are wholly applicable to bicycle workstation 100B and other embodiments of a bicycle workstation consistent with the present teachings.

Figure 11A:
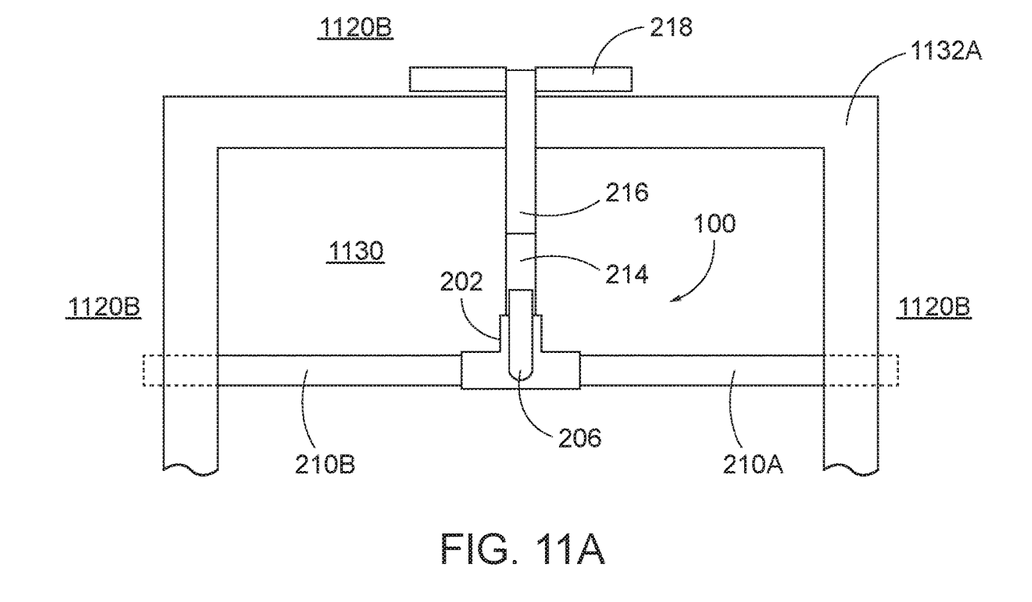
FIG. 11A depicts a back view of the bicycle workstation suspended in a doorway.

FIG. 11A depicts a back view of bicycle workstation 100A suspended in doorway 1130. Pictured are the back of coupler 202, fastener 206, upright tube 214, s-tube 216, grip bar 218, and cross tubes 210A and 210B. Grip bar 218 rests on top of door frame/moulding 1132B and abuts surface or "wall-side" 1120B of wall 1120 (see FIG. 11C) above it. Cross tubes 210A and 210B abut the door frame/moulding on the other side of the door way.

Figure 11B:
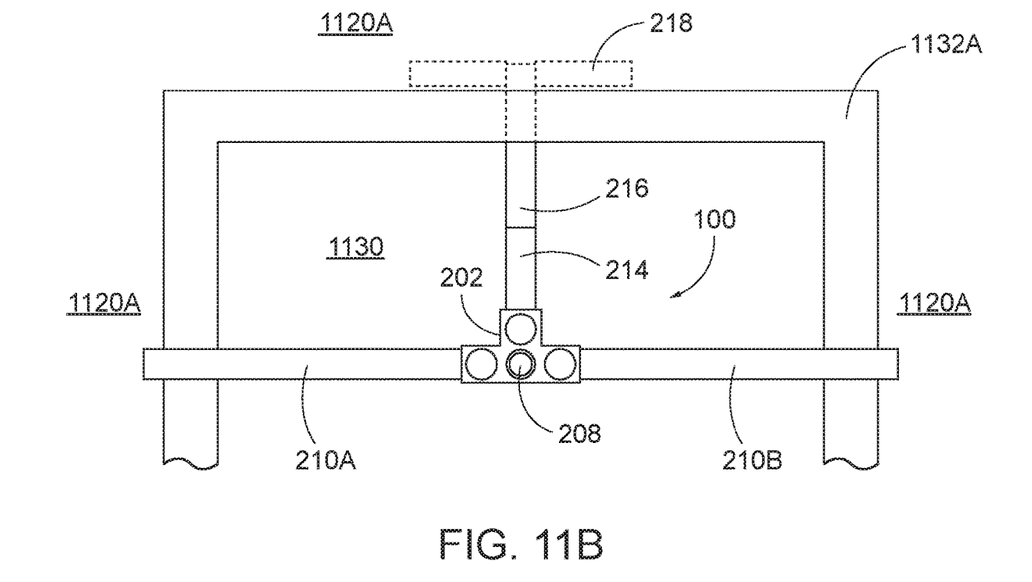
FIG. 11B depicts a front view of the bicycle workstation suspended in a doorway.

FIG. 11B depicts a front view of the bicycle workstation shown in FIG. 11A. Pictured are the front of coupler 202, bicycle support-tube 208 (sans clamp 204 for clarity), upright tube 214, s-tube 216, and cross tubes 210A and 210B, and grip bar 218. The cross tubes 210A and 210B abut door frame/moulding 1132A on wall-side 1120A of wall 1120.

Figure 11C:
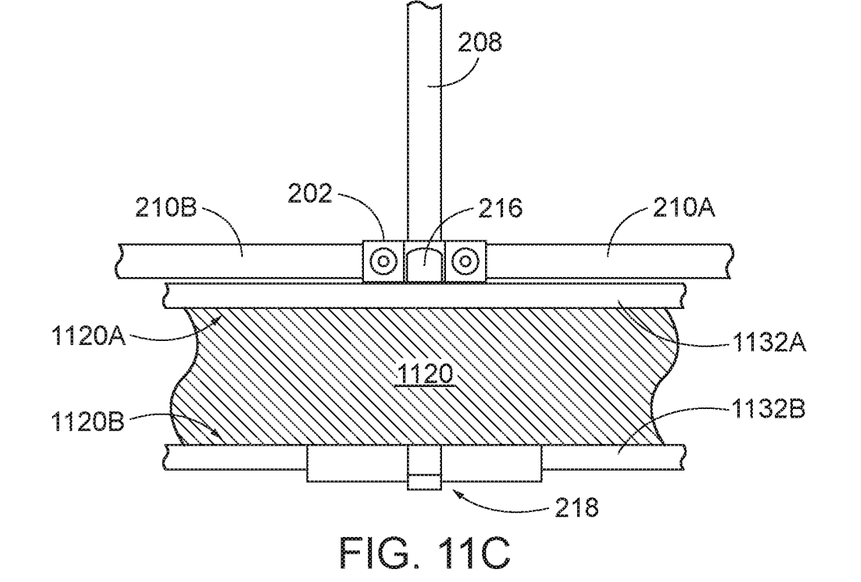
FIG. 11C depicts a top view of the bicycle workstation in a doorway.

FIG. 11C depicts a top view of the bicycle workstation shown in FIG. 11A. Pictured are grip bar 218, coupler 202, bicycle support-tube 208 (sans clamp 104), cross tubes 210A and 210B, and s-tube 216. Grip bar 218 rests on door frame/moulding 1132B on wall-side 1120B of wall 1120. Cross tubes 210A and 210B abut door frame/moulding 1132A on wall-side 1120A of wall 1120.

FIG. 12 depicts a simplified illustration of some of the forces acting on embodiments of bicycle workstation 100. Depicted are coupler 202, bicycle support-tube 208, cross tube 210A, upright tube 214, s-tube 216, and grip bar 218. Bicycle 10 is clamped to the free end of clamp bar 208. Because of the fact the workstation is suspended by door frame/molding 1132B, and because the center of mass of bicycle 10 is offset by the length of bicycle support-tube 208 from the doorway, a moment (torque) results. This moment results in a force directed into door frame/moulding 1132A at cross tubes 210A and 210B (the latter not depicted), as well as a force directed into the wall above the door frame/moulding 1132B at grip bar 218. Thus, bicycle workstation 100 is stably supported due to the combination of the support provided by door frame/moulding 1132B, and the moment that forces the cross tubes against the door frame/moulding and the grip bar against the wall.

For this disclosure and the appended claims, unless otherwise indicated, all numbers expressing dimensions or weight are to be understood as being modified in all instances by the term "about" or "substantially." In this context, these terms mean a variation of at least +/−20%. Accordingly, unless indicated to the contrary, the numerical parameters set forth in the following specification and attached claims are understood to be approximations that may vary depending upon the desired properties to be obtained in ways that will be understood by those skilled in the art.

Also, it is to be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

For use in this disclosure and the appended claims, the term "elongate member" means an element in which length is the longest dimension, typically, but not necessarily, by a factor of at least 10, for the major portion thereof. Examples of elongate members include tubes, shafts, rods, sticks, bar, poles, and the like having the aforementioned aspect ratio. Thus, for example, a tube having a length of 11 inches and a diameter of 1 inch is consistent with the definition of "elongate member." Moreover, an "elongate member" can comprise one or more elements. For example, when attached to one another, upright tube 214 and s-tube 216 are considered, collectively, to be an "elongate member." Furthermore, when attached to one another, upright tube 214, s-tube 216, and grip bar 218 are considered, collectively, to be an "elongate member."

It is to be understood that the disclosure describes a few embodiments and that many variations of the invention can easily be devised by those skilled in the art after reading this disclosure and that the scope of the present invention is to be determined by the following claims.

What is claimed:

1. A bicycle workstation comprising:
   a plurality of elongate members;
   a coupler having a first plurality of openings located, collectively, at four surfaces thereof, wherein at least one of the surfaces has more than one of the openings, the openings capable of detachably receiving the elongate members and orienting same in a stow configuration or an operational configuration based on which openings the elongate members couple to, and wherein:
   in the stow configuration, all of the elongate members of the plurality are substantially parallel to one another; and
   in the operational configuration, a first, second and third elongate member of the plurality are configurable, when the bicycle workstation is in use, to abut surfaces that are proximate to a doorway at a total of at least three locations, wherein:
   (a) the first elongate member is configured to abut a first surface on a first side of a wall in which the doorway resides;
   (b) the second and third elongate members are configured to abut respective second and third surfaces proximate to right and left sides of the doorway on the second side of the wall, (c) a fourth elongate member of the plurality, which is not configured to abut a surface proximate to the doorway, and is configured to extend away from the doorway; and
a clamp, wherein the clamp is coupled to the fourth elongate member and is physically adapted to clamp to a bicycle.

2. The bicycle workstation of claim 1 wherein the first elongate member comprises a grip bar, and wherein the first elongate member provides an offset that, when in use, enables the grip bar to abut the first surface on the first side of the wall, and the second and third elongate members to abut the respective second and third surfaces on the second side of the wall.

3. The bicycle workstation of claim 2 wherein, when in use, the grip bar rests on a door frame or a moulding located on the first side of the wall, above the doorway.

4. The bicycle workstation of claim 1 wherein the clamp is dimensioned and arranged to clamp to any of a seat post, seat tube, or top tube of the bicycle.

5. The bicycle workstation of claim 1 wherein the clamp is rotatable.

6. The bicycle workstation of claim 1 wherein at least some of the first, second, third and fourth elongate members comprise spring-loaded pins.

7. The bicycle workstation of claim 6 wherein the coupler includes a second plurality of openings that cooperate with the spring-loaded pins to lock, to the coupler, the elongate members having the pins.

8. A bicycle workstation comprising: a plurality of elongate members, wherein a first, a second, and a third elongate member of the plurality thereof are configurable, when in use, to abut surfaces at respective first, second, and third contact locations that are proximate to a doorway, but that do not abut a surface of a door, wherein:
  (i) at the first contact location, a first portion of the first elongate member is configured to rest on a door frame or moulding of the doorway, wherein the first contact location is on a first side of a wall in which the doorway resides,
  (ii) at the second and third contact locations, respective second and third elongate members are configured to abut surfaces that are proximate to respective right and left sides of the doorway, wherein the second and third contact locations are on a second side of a wall in which the doorway resides,
  (iii) a fourth elongate member of the plurality thereof, wherein the fourth elongate member includes a clamp for coupling to a bicycle.

9. A bicycle workstation comprising:
a plurality of elongate members, wherein a first, a second, and a third elongate member of the plurality thereof are configurable, when in use, to abut surfaces at respective first, second, and third contact locations that are proximate to a doorway, but that do not abut a surface of a door, wherein:
  (i) at the first contact location, a first portion of the first elongate member is configured to rest on a door frame or moulding of the doorway, wherein the first contact location is on a first side of a wall in which the doorway resides,
  (ii) at the second and third contact locations, respective second and third elongate members are configured to abut surfaces that are proximate to respective right and left sides of the doorway, wherein the second and third contact locations are on a second side of a wall in which the doorway resides,
  (iii) a fourth elongate member of the plurality thereof, wherein the fourth elongate member includes a physical adaptation for coupling to a bicycle; and
  a coupler, wherein the coupler includes a plurality of openings for detachably receiving the plurality of elongate members.

10. The bicycle workstation of claim 9 wherein the plurality of openings of the coupler are sited on different surfaces thereof, wherein, when the bicycle workstation is in use, the elongate members are received by openings on four different surfaces of the coupler.

11. The bicycle workstation of claim 9 wherein the bicycle workstation has a stow configuration when not in use, wherein in the stow configuration, the elongate members are received exclusively by openings on a single surface of the coupler.

12. A bicycle workstation comprising:
a plurality of elongate members, wherein a first, a second, and a third elongate member of the plurality thereof are configurable, when in use, to abut surfaces at respective first, second, and third contact locations that are proximate to a doorway, but that do not abut a surface of a door, wherein:
  (i) at the first contact location, a first portion of the first elongate member is configured to rest on a door frame or moulding of the doorway, wherein the first portion of the first elongate member comprises a grip bar, wherein a long axis of the grip bar is perpendicular to a long axis of other portions of the first elongate member, and wherein the first contact location is on a first side of a wall in which the doorway resides,
  (ii) at the second and third contact locations, respective second and third elongate members are configured to abut surfaces that are proximate to respective right and left sides of the doorway, wherein the second and third contact locations are on a second side of a wall in which the doorway resides,
  (iii) a fourth elongate member of the plurality thereof, wherein the fourth elongate member includes a physical adaptation for coupling to a bicycle.

13. A bicycle workstation comprising:
a plurality of elongate members, wherein a first, a second, and a third elongate member of the plurality thereof are configurable, when in use, to abut surfaces at respective first, second, and third contact locations that are proximate to a doorway, but that do not abut a surface of a door, wherein:
  (i) at the first contact location, a first portion of the first elongate member is configured to rest on a door frame or moulding of the doorway, wherein the first contact location is on a first side of a wall in which the doorway resides,
  (ii) at the second and third contact locations, respective second and third elongate members are configured to abut surfaces that are proximate to respective right and left sides of the doorway, wherein the second and third contact locations are on a second side of a wall in which the doorway resides,
  (iii) a fourth elongate member of the plurality thereof, wherein the fourth elongate member includes a physical adaptation for coupling to a bicycle; and
  (iv) at least some of the first, second, third and fourth elongate members comprise spring-loaded pins.

14. The bicycle workstation of claim 13 comprising a coupler, wherein the coupler includes a plurality of openings that cooperate with the spring-loaded pins to lock, to the coupler, elongate members having the pins.

15. A bicycle workstation comprising:
a plurality of elongate members, wherein a first, a second, and a third elongate member of the plurality thereof are configurable, when in use, to abut surfaces at respective first, second, and third contact locations that are proximate to a doorway, but that do not abut a surface of a door, wherein:
(i) at the first contact location, a first portion of the first elongate member is configured to rest on a door frame or moulding of the doorway, wherein the first contact location is on a first side of a wall in which the doorway resides,
(ii) at the second and third contact locations, respective second and third elongate members are configured to abut surfaces that are proximate to respective right and left sides of the doorway, wherein the second and third contact locations are on a second side of a wall in which the doorway resides,
(iii) a fourth elongate member of the plurality thereof, wherein the fourth elongate member includes a physical adaptation for coupling to a bicycle; and
a coupler, wherein the elongate members are rotatably coupled to the coupler, and wherein the coupler is configured so that each of the first, second, and third elongate members are rotatable between the stow configuration and the operational configuration.

16. A bicycle workstation comprising:
a plurality of elongate members, wherein a first, a second, and a third elongate member of the plurality thereof are configurable, when in use, to abut surfaces at respective first, second, and third contact locations that are proximate to a doorway, but that do not abut a surface of a door, wherein:
(i) at the first contact location, a first portion of the first elongate member is configured to rest on a door frame or moulding of the doorway, wherein the first portion of the first elongate member comprises a grip bar, and wherein the first contact location is on a first side of a wall in which the doorway resides,
(ii) at the second and third contact locations, respective second and third elongate members are configured to abut surfaces that are proximate to respective right and left sides of the doorway, wherein the second and third contact locations are on a second side of a wall in which the doorway resides,
(iii) a fourth elongate member of the plurality thereof, wherein the fourth elongate member includes a physical adaptation for coupling to a bicycle, and
(iv) wherein the first elongate member provides an offset that enables the grip bar, when in use, to abut the first side of the wall, and the second and third elongate members to abut the surfaces on the second side of the wall.

17. A bicycle workstation comprising:
a plurality of elongate members, wherein a first, a second, and a third elongate member of the plurality thereof are configurable, when in use, to abut surfaces at respective first, second, and third contact locations that are proximate to a doorway, but that do not abut a surface of a door, wherein:
(i) at the first contact location, a first portion of the first elongate member is configured to rest on a door frame or moulding of the doorway, wherein the first contact location is on a first side of a wall in which the doorway resides,
(ii) at the second and third contact locations, respective second and third elongate members are configured to abut surfaces that are proximate to respective right and left sides of the doorway, wherein the second and third contact locations are on a second side of a wall in which the doorway resides, the first contact location is higher than the second and third contact locations,
(iii) a fourth elongate member of the plurality thereof, wherein the fourth elongate member includes a physical adaptation for coupling to a bicycle.

18. A bicycle workstation comprising:
a plurality of elongate members, wherein a first, a second, and a third elongate member of the plurality thereof are configurable, via a coupling having plural openings across plural surfaces thereof that receive the elongate members, to abut surfaces at respective first, second, and third contact locations that are proximal to a doorway, which contact locations do not abut a surface of a door, wherein:
a) at the first contact location, a first portion of the first elongate member is configured to abut a first surface on a first side of a wall in which the doorway resides,
b) at the second and third contact locations, respective second and third elongate members are configured to abut surfaces that are proximate to respective right and left sides of the doorway on a second side of a wall in which the doorway resides, wherein the first contact location is vertically higher than the second and third contact locations;
c) a fourth elongate member of the plurality, which is received by the coupling but is not configured to abut a surface proximate to the doorway, is configured to extend away from the doorway and couples to a clamp.

19. The bicycle workstation of claim 18 wherein each one of the first, second, third, and fourth elongate members are received by an opening at a different surface of the coupler.

20. The bicycle workstation of claim 18 wherein the coupling is operable to configure the bicycle workstation in a stow configuration wherein the first, second, third, and fourth elongate member are received by openings at a single surface of the coupler.

* * * * *